United States Patent [19]

Sakata

[11] Patent Number: 5,299,037
[45] Date of Patent: Mar. 29, 1994

[54] DIFFRACTION GRATING TYPE LIQUID CRYSTAL DISPLAY DEVICE IN VIEWFINDER

[75] Inventor: Hajime Sakata, Hiratsuka, Japan

[73] Assignee: Canon Kabushiki Kaisha, Tokyo, Japan

[21] Appl. No.: 92,569

[22] Filed: Jul. 16, 1993

Related U.S. Application Data

[63] Continuation of Ser. No. 785,252, Nov. 4, 1991, abandoned, which is a continuation of Ser. No. 328,766, Mar. 27, 1989, abandoned, which is a continuation of Ser. No. 891,905, Aug. 1, 1986, abandoned.

Foreign Application Priority Data

Aug. 7, 1985 [JP] Japan .................. 60-173790
Aug. 7, 1985 [JP] Japan .................. 60-173791

[51] Int. Cl.$^5$ .................. G02F 1/13; G02B 5/18; G03B 17/20
[52] U.S. Cl. .................. 359/41; 359/95; 359/81; 359/569; 354/471
[58] Field of Search .................. 350/335, 347 E, 347 V, 350/347 R, 350 S, 348, 330, 341, 331 R, 344, 336, 169–174, 162.2, 162.17, 356, 363; 354/471–475, 409, 200, 219, 225, 289.1, 289.12; 359/41, 95, 81, 568–571, 573, 574

[56] References Cited

U.S. PATENT DOCUMENTS

| | | | |
|---|---|---|---|
| 3,698,795 | 10/1972 | Flint | 350/162.22 |
| 3,791,716 | 2/1974 | Borel et al. | 350/348 |
| 3,813,145 | 5/1974 | Hedman, Jr. et al. | 359/95 |
| 3,843,231 | 10/1974 | Borel et al. | 350/348 |
| 3,961,348 | 6/1976 | Miyazaki | 359/41 |
| 4,140,378 | 2/1979 | Suzuki et al. | 350/331 R |
| 4,165,930 | 8/1979 | Matsumoto et al. | 354/466 |
| 4,251,137 | 2/1981 | Knop et al. | 350/347 V |
| 4,255,032 | 3/1981 | Matsumoto et al. | 354/466 |
| 4,294,529 | 10/1981 | Sato et al. | 354/466 |
| 4,367,924 | 1/1983 | Clark et al. | 350/350 S |
| 4,374,612 | 2/1983 | Matsumura et al. | 354/466 |
| 4,389,096 | 6/1983 | Hori et al. | 359/41 |
| 4,411,495 | 10/1983 | Beni et al. | 350/347 V |
| 4,426,130 | 1/1984 | Knop | 350/162.2 |
| 4,465,355 | 8/1984 | Murakami et al. | 354/475 |
| 4,536,061 | 8/1985 | Nishimura | 350/354 |
| 4,560,264 | 12/1985 | Kitazawa et al. | 354/289.1 |
| 4,572,617 | 2/1986 | Masaki et al. | 359/77 |
| 4,729,640 | 3/1988 | Sakata | 350/348 |
| 4,729,641 | 3/1988 | Matsuoka et al. | 350/345 |
| 4,751,509 | 6/1988 | Kubota et al. | 350/348 |
| 4,834,500 | 5/1989 | Hilsum et al. | 350/348 |
| 4,850,681 | 7/1989 | Yamanobe et al. | 350/348 |
| 4,850,682 | 7/1989 | Gerritsen | 359/95 |
| 5,013,141 | 5/1991 | Sakata | 359/94 |

FOREIGN PATENT DOCUMENTS

| | | | |
|---|---|---|---|
| 3237370 | 5/1983 | Fed. Rep. of Germany | . |
| 3535391 | 4/1986 | Fed. Rep. of Germany | 350/334 |
| 0221729 | 11/1985 | Japan | 350/347 R |
| 0002130 | 1/1986 | Japan | 350/334 |
| 3605516 | 9/1986 | Japan | . |
| 2169417 | 7/1986 | United Kingdom | 350/334 |

OTHER PUBLICATIONS

S. Pollack—"A Low Noise Amplifier", pp. 140–144—SID 76 DIGEST—May 1976.
S. Lo—"Light Diffraction Phenomena in an A.C. . . . Nematic Liquid Crystal Sample", pp. 2138–2140—Journal Applied Physics—vol. 42—Aug. 1971.

Primary Examiner—William L. Sikes
Assistant Examiner—Tai Van Duong
Attorney, Agent, or Firm—Fitzpatrick, Cella, Harper & Scinto

[57] ABSTRACT

There is provided a display device in a viewfinder, including a diffraction grating whose shape is determined at an interface between first and second materials, at least one of the first and second materials being adapted to have a variable refractive index for light reflected by an object to be photographed, and control means for changing the refractive index of the first and/or second materials, wherein the control means causes the light from the object to substantially pass through the diffraction grating in a first state and causes the diffraction grating to partially diffract the light from the object to display a pattern in a second state.

24 Claims, 11 Drawing Sheets

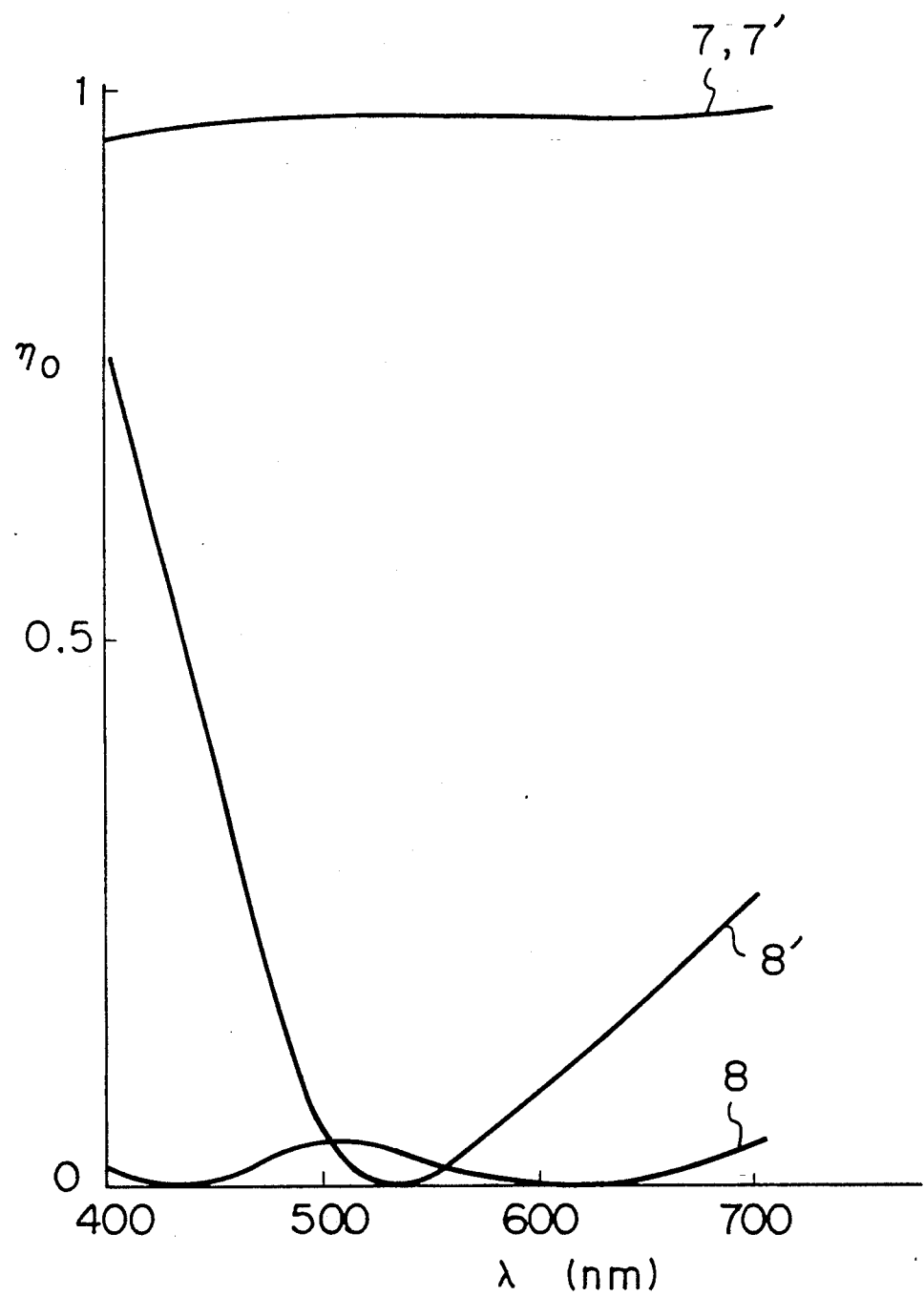

Fig. 8A
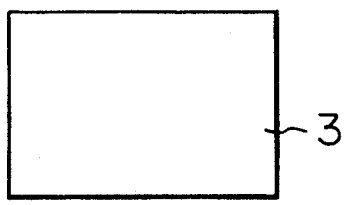
Fig. 8B
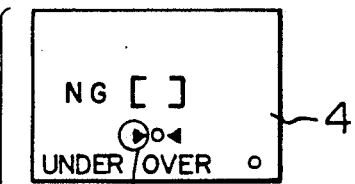
Fig. 8C
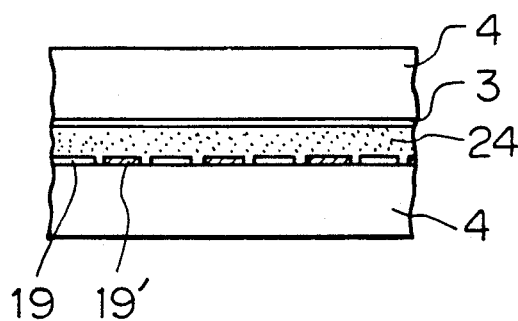
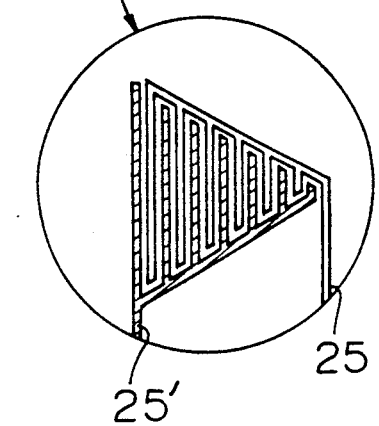
Fig. 9A
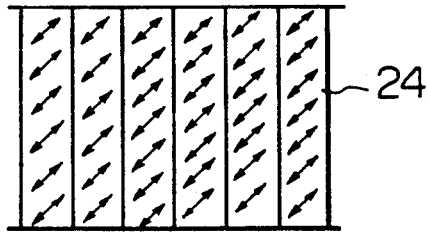
Fig. 9B
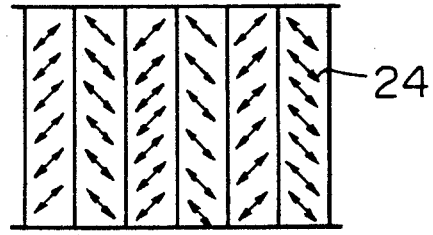

DIFFRACTION GRATING TYPE LIQUID CRYSTAL DISPLAY DEVICE IN VIEWFINDER

This application is a continuation of application Ser. No. 07/785,252 filed Nov. 4, 1991, which is a continuation of application Ser. No. 07/328,766 filed Mar. 27, 1989, which is a continuation of application Ser. No. 06/891,905, filed Aug. 1, 1986, all of which are now abandoned.

BACKGROUND OF THE INVENTION

1. Field of the Invention

The present invention relates to a display device and, more particularly, to a display device in a viewfinder for displaying various types of photographing information within the viewfinder in a photographing apparatus such as a camera and a video tape recorder.

2. Related Background Art

In order to display predetermined photographing information in a viewfinder in a photographing apparatus such as a camera and a VTR, LEDs and liquid crystal elements are arranged outside of the viewing frame. However, a user may miss an alarm display of overexposure or underexposure with this display mechanism. In addition, it is impossible to display an in-focus range and an optimal exposure range.

Although electronic cameras and VTRs and other "intelligent" apparatuses have been developed, novel information display devices in viewfinders have been rarely proposed. Demand has thus arisen for developing intelligent display devices which satisfy the user's needs. In association with the drawbacks of the conventional display devices in viewfinders, the present applicant proposes an overlying display arrangement wherein a liquid crystal display element is arranged in a field of view, i.e., the optical path of light reflected from an object to be photographed. For example, Japanese Patent Disclosure (Kokai) No. 52-110626 describes a display device in a viewfinder utilizing a TN (Twisted Nematic) liquid crystal display element. Since this display element normally uses a polarizing plate, the maximum light utilization efficiency obtainable is 50% so that the viewfinder is undesirably darkened. Japanese Patent Disclosure (Kokai) No. 58-62626 describes a display device in a viewfinder utilizing a GH (Guest-Host) liquid crystal display element. Although a polarizing plate can be eliminated from this display element, pigment molecules always absorb light. As a result, light utilization efficiency is degraded again, as in Japanese Patent Disclosure (Kokai) No. 52-110626, thus darkening the viewfinder. A hologram display device is also proposed. This display device is arranged in the optical path of light from an object to be photographed and is illuminated by an LED or the like. A shadow is formed by the hologram even in the nondisplay mode. Therefore, the hologram display device is not suitable for use as a display device in a viewfinder. In addition, it is impossible to perform versatile display of any numerical values by using the so-called 7-segment display elements.

The conventional display devices in viewfinders darken the viewfinders and form shadows therein, though such display devices can be conveniently used to display information in the field of view.

SUMMARY OF THE INVENTION

It is an object of the present invention to provide a display device in a viewfinder which keeps the viewfinder bright and performs display within the field of view, in consideration of the drawbacks of the conventional display devices in viewfinders.

In order to achieve the above object of the present invention, there is provided a display device in a viewfinder, comprising a diffraction grating whose shape is determined at an interface between first and second materials, at least one of the first and second materials being adapted to have a variable refractive index for light reflected by an object to be photographed, and control means for changing the refractive index of the first and/or second materials, wherein the control means causes the light from the object to substantially pass through the diffraction grating in a first state and causes the diffraction grating to partially diffract the light from the object to display a pattern in a second state.

According to the display device in the viewfinder having the characteristic features described above, although a display element is arranged in an optical path of the light from object to be photographed, i.e., the field of view, the light from the object substantially passes through the viewfinder in the nondisplay mode, thus preventing the viewfinder from being darkened. In addition, the field of view in the viewfinder is substantially free from shadowing caused by the presence of the display element.

The diffraction grating may have any shape. A single diffraction grating or a plurality of overlying diffraction gratings are formed or cancelled in the propagating direction of light from the object to modulate the light, thereby providing a novel display device in a viewfinder.

BRIEF DESCRIPTION OF THE DRAWINGS

FIG. 3 is a graph showing spectral transmittances of triangular and rectangular gratings as a function of visible light wavelengths in the light transmission and shielding states;

FIGS. 8A to 8C are views respectively for explaining the steps in manufacturing another display device in a viewfinder;

FIGS. 9A and 9B are views respectively for explaining a method of driving the display device in FIGS. 8A to 8C;

DETAILED DESCRIPTION OF THE PREFERRED EMBODIMENT

Figure 1:
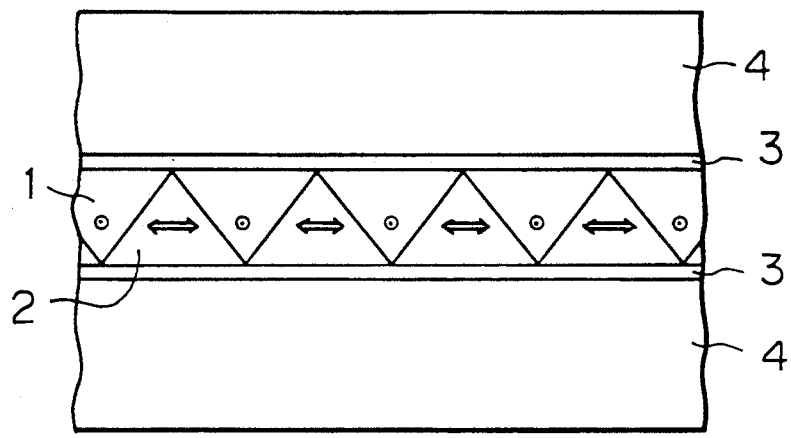
FIG. 1 is a view for explaining a basic arrangement of a display element in a display device in a viewfinder.

FIG. 1 shows a basic arrangement of a display element used in a display device in a viewfinder according to the present invention so as to explain its principle of operation. Variable refractive index type materials 1 and 2 comprises an optically anisotropic material. The display element also includes transparent electrodes 3 sandwiching the materials 1 and 2 therebetween, and transparent optical members 4 respectively formed on the transparent electrodes 3. Light 5 is incident on the display element in a direction indicated by a thick arrow. Polarizing components 6 and 6' are perpendicular to the direction of incident light 5.

In the display element of FIG. 1, a triangular grating is formed by an interface between the anisotropic materials 1 and 2 such as a liquid crystal or a birefringent crystal. The optical axes of the anisotropic materials 1 and 2 are in the direction of arrows, i.e., a direction of grooves of the grating (a direction perpendicular to the surface of FIG. 1) and the direction of array of the materials 1 and 2 (a right-and-left direction in FIG. 1). Therefore, these optical axes are perpendicular to each other. The grating layer is sandwiched between the two transparent optical members 4 having the transparent electrodes 3 on their surfaces.

Light having random polarization characteristics can be generally divided into the two polarization components 6 and 6' perpendicular to each other, as shown in FIG. 1. It is assumed that the display element in FIG. 1 is driven with an electric field. In an off state where an electric field is not applied across the transparent electrodes 3, the direction of polarization of the polarization component 6 of the incident light 5 coincides with that of the optical axis of the anisotropic material 1. The polarization component 6 is diffracted at an extraordinary index $n_e$ of the anisotropic material 1. Since the direction of polarization of the polarization component 6 is perpendicular to the optical axis of the anisotropic material 2, the polarization component 6 is diffracted at an ordinary index $n_o'$ of the anisotropic material 2. Similarly, the polarization component 6' of the incident light 5 is diffracted by the anisotropic materials 1 and 2 at ordinary and extraordinary indexes $n_o$ and $n_e'$. Therefore, a diffraction grating having refractive indexes $n_e$ and $n_o'$ and the refractive indexes $n_o$ and $n_e'$ is formed for the polarization components 6 and 6'. In a state where an electric field is applied across the transparent electrodes 3, the directions of the optical axes of the anisotropic materials 1 and 2 are changed by the electric field according to its magnitude. At the same time, the refractive indexes for the polarization components 6 and 6' of the incident light 5 are also changed according to the degree of modulation (a phase difference in the diffraction grating) of the grating. A predetermined electric field is applied to the anisotropic materials 1 and 2 such that the refractive indexes thereof for the polarization components 6 and 6' become equal to each other. In this case, the phase type diffraction grating is absent for the incident light 5. Therefore, the incident light 5 simply passes through the grating consisting of the anisotropic materials 1 and 2.

For example, if a positive dielectric nematic liquid crystal is used as the anisotropic materials 1 and 2 ($n_o = n_o'$ and $n_e = n_e'$), the liquid crystal molecules are aligned in the direction of the electric field upon its application. The liquid crystal alignment direction coincides with the optical axes. The polarization components 6 and 6' of the incident light 5 transmit through the grating including the liquid crystal while the components 6 and 6' are diffracted at the ordinary index $n_o$. In the off state where an electric field is not applied to the display element, the liquid crystal molecules are aligned in the directions of the arrows. The polarization components 6 and 6' of the incident light 5 are diffracted by the grating having the refractive indexes $n_e$ and $n_o$. Diffraction efficiency $\eta 0$ of the transmitted light of the 0th order diffracted by the triangular diffraction grating of the liquid crystal is approximated by equation (1) below:

$$\eta 0 = \mathrm{sinc}^2(\pi \Delta n \cdot T / \lambda) \qquad (1)$$

$\lambda$: the wavelength of the incident light 5
$\Delta n$: the difference between refractive indexes of the anisotropic materials 1 and 2 of the liquid crystal
$T$: the thickness of the liquid crystal layer (i.e., the height of the grating)

If $\Delta n\mathrm{max} = |n_e - n_o|$, $\Delta n\mathrm{min} = 0$, and $\Delta n \cdot T = m\lambda$ (where $m = 1, 2, 3, \ldots$), then $\eta 0 = 0$. In other words, the polarization components 6 and 6', of the incident light are diffracted by the diffraction grating and is output as diffracted light of a higher order. No light components of the 0th order exist. If $\Delta n = 0$, i.e., and if the refractive indexes of the anisotropic materials 1 and 2 are identical with respect to the polarization components 6 and 6', the incident light 5 simply passes through the grating as if the grating does not exist. All the transmitted light components are of the 0th order. Since the refractive index difference $\Delta n$ varies according to the magnitude of the electric field applied across the opposite transparent electrodes 3, the diffraction efficiency $\eta 0$ given by equation (1) varies by controlling the electric field magnitude.

As is apparent from the above description, even if light is natural light or light reflected from the object to be photographed, which has random polarization characteristics, light modulation i.e., transmission control of the polarization components is performed for the polarization components perpendicular to each other. Light modulation can be achieved without degrading light utilization efficiency.

Figure 2A:
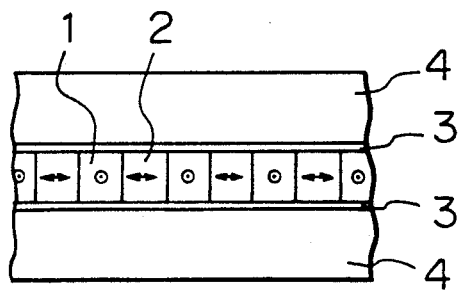
FIGS. 2A and 2B are views respectively showing different grating shapes of the display element in FIG. 1.
Figure 2B:
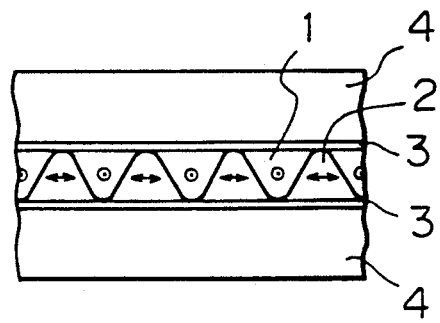

FIGS. 2A and 2B show different grating shapes in the display element. FIG. 2A shows the display element with a rectangular grating, and FIG. 2B shows the display element with a sinusoidal grating. The same reference numerals as in FIG. 1 denote the same parts in FIGS. 2A and 2B.

The display element can be formed regardless of the grating shapes (FIGS. 2A and 2B). If the grating shape varies, equation (1) must be modified. For the rectangular grating, the diffraction efficiency of the transmitted light of the 0th order is approximated as follows:

$$\eta 0 = \{1 + \cos(2\pi \Delta n \cdot T/\lambda)\}/2 \quad (2)$$

Equation (2) is established when a grating pitch P is substantially larger than the wavelength λ of the incident light 5. However, if the grating pitch P is equal to or smaller than the wavelength λ, equation (1) or (2) derived from a simple diffraction theory cannot be established. If λ≧P, an accurate diffraction efficiency must be derived from a complicated simulation taking vector characteristics of the light wave into account.

Spectral characteristic differences between different grating shapes will be described in detail below.

FIG. 3 shows the spectral transmittance characteristics of the display element at a visible light wavelength range of 400 to 700 nm when the triangular and rectangular gratings are used. The transmittance $\eta 0$ is plotted along the ordinate, and the wavelength λ is plotted along the abscissa. Characteristic curves 7 and 7' represent characteristics of the triangular and rectangular gratings when light is transmitted therethrough. Characteristic curves 8 and 8' represent characteristics of the triangular and rectangular gratings when light is shielded. As is apparent from FIG. 3, the rectangular grating has good wavelength selectivity, and the triangular grating has almost no wavelength selectivity. In pattern display by the display element (FIG. 1) with light from an object as illumination light, a substantially rectangular grating is preferably used for color display, and a substantially triangular or sinusoidal grating is preferably used for monochromatic display.

The shape of the grating is selected according to workability, an application purpose of the photographing apparatus, a display device peripheral system, and technical specifications.

In particular, for color display, the color characteristics of light of the 0th order from the diffraction grating is determined by a phase difference received by the light from the object to be photographed. In other words, by controlling "$\Delta n \cdot T$" in equations (1) and (2), light of the 0th order can be output at a desired transmittance. Therefore, for the fabrication of the display element, if the variable refractive index type material is determined, the height T of the grating is varied and is set to be an optimal value so as to obtain a desired ΔnT. The display element is switched between the transparent state and the colored pattern state upon application/removal of the electric field.

The variable refractive index type materials are classified into isotropic and anisotropic materials according to their optical characteristics. In particular, the anisotropic materials are liquid crystals and electrooptical crystals. Examples of the anisotropic material are PLZT, LiNbO$_3$, LiTaO$_3$, TiO$_2$, PMMA, CCl$_4$, KDP, ADP, ZnO, BaTiO$_3$, Bi$_{12}$SiO$_{20}$, Ba$_2$NaNb$_5$O$_{15}$, MnBi, EuO, CS$_2$, Gd$_2$(MoO$_4$)$_3$, Bi$_4$Ti$_3$O$_{12}$, CuCl, GaAs, ZnTe, As$_2$Se$_3$, Se, AsGeSeS, DKDP, MNA, mNA, urea, a photoresist, the above-described nematic liquid crystal, a cholesteric liquid crystal, a smectic liquid crystal, and a ferrodielectric liquid crystal. Among these materials, liquid crystals are most suitable materials since they are inexpensive and can be easily controlled.

The display device of the present invention can display monochromatic patterns upon transmission and shielding (diffraction) of light reflected by the object and color patterns by utilizing spectral transmittance characteristics of the diffraction grating.

The grating is formed by photolithography with a resist pattern, a combination of photolithography and dry etching replica with a thermosetting or ultraviolet-cured resin, cutting with a ruling engine, or embossing.

Energy for controlling a refractive index of a variable refractive index type material can be selected from an electric field, an electric current, a magnetic field, heat, pressure and light in association with the characteristics of the variable refractive index type material. A control means for controlling the refractive index can be selected by the form of energy in association with other members constituting the display element.

The fabrication process of the display device using the display element in FIG. 1 will be described hereinafter.

FIGS. 4A to 4D are views showing the steps in manufacturing the display element in FIG. 1. The same reference numerals as in FIG. 1 denote the same parts in FIGS. 4A to 4D. A positive dielectric nematic liquid crystal is used as an anisotropic material.

Figure 4A:
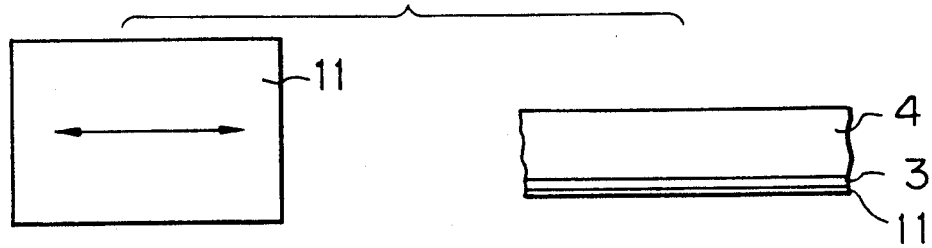
FIGS. 4A to 4D are views for explaining the steps in manufacturing the display device using the display element shown in FIG. 1.
Figure 4B:
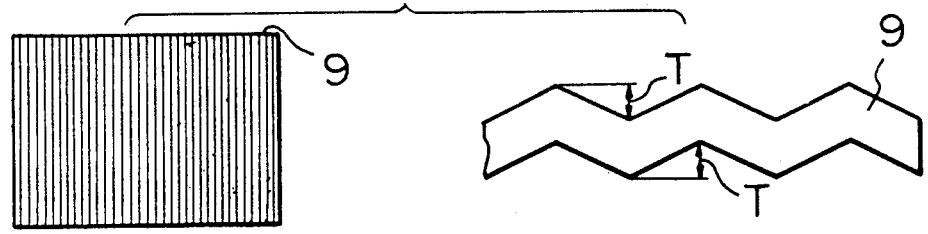
Figure 4C:
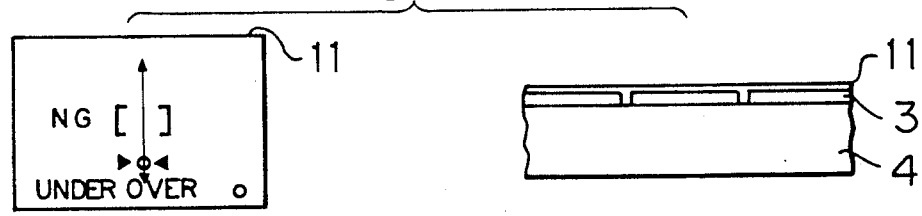
Figure 4D:
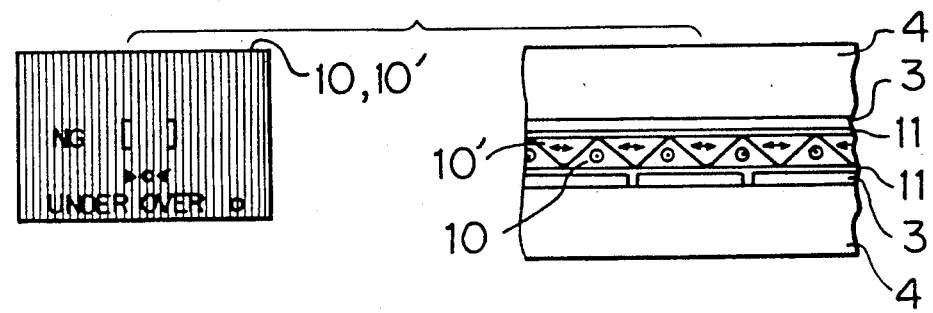

As shown in FIG. 4A, both major surfaces of a glass substrate 4 of Corning 7059 (trade name: available from Corning Glass Works, U.S.A.) having dimensions of 37 mm×26 mm×1 mm were polished to form transparent flat surfaces. A 1,000-Å thick ITO film was deposited on the surface of the substrate 4 to constitute a transparent electrode 3. An SiO insulating film 11 was obliquely deposited on the transparent electrode 3 so as to align the liquid crystal molecules in a direction of an arrow in FIG. 4A. An ITO film was used to form a patterned transparent electrodes 3 (FIG. 4C) on a glass substrate 4 which was identical with the substrate 4 described above. An SiO insulating film was obliquely deposited on the patterned transparent electrode 3 so as to align the liquid crystal molecules in a direction of an arrow in FIG. 4C. A wave-like transparent spacer 9 was formed by rolling, as shown in FIG. 4B. The height T of the transparent spacer 9, i.e., the peak-to-peak distance thereof was 2.3 μm. The two glass substrates 4 were used to sandwich the transparent spacer 9 such that the transparent electrodes 3 opposed each other. Positive dielectric nematic liquid crystals 10 and 10' were filled and sealed in the spaces between the upper and lower glass substrates 4, thus preparing the display device shown in FIG. 4D. In this case, the liquid crystal 10 was aligned along the direction of the grooves of the grating, and the liquid crystal 10' was aligned along the direction of alignment of the grating.

In the display elements in FIG. 1 and FIGS. 2A and 2B, the materials having optical anisotropy are alternately arranged. However, materials having optical isotropy may be alternately arranged. More specifically, in the arrangement of FIG. 1, a transparent optical member may be used in place of the optically anisotropic material 1, and a transparent variable refractive index type material of a liquid or the like having a variable refractive index may be used in place of the optically anisotropic material 2. The refractive index of the variable refractive index type material is changed to perform diffraction switching. If a material having optical isotropy is used as a variable refractive index type material, light modulation can be performed substantially regardless of the state of the plane of polarization of the incident light.

A transparent optical member may be used in place of the optically anisotropic material 1 and may be used together with the optically anisotropic material 2 to constitute a display element. In this case, when the refractive index of the optically anisotropic material 2 of a liquid crystal or the like coincides with that of the transparent optical member, the light reflected by the object can pass through the grating in a given state. However, if the refractive index of the optically anisotropic material 2 differs from that of the transparent optical member, the diffraction grating functions to partially diffract the light reflected by the object to be photographed, thereby displaying a photographing information pattern. With the above arrangement, halftone display is performed without considering the polarization characteristics of the object in the same manner as described above. However, as a matter of fact, the viewfinder can be kept bright.

Figure 5:
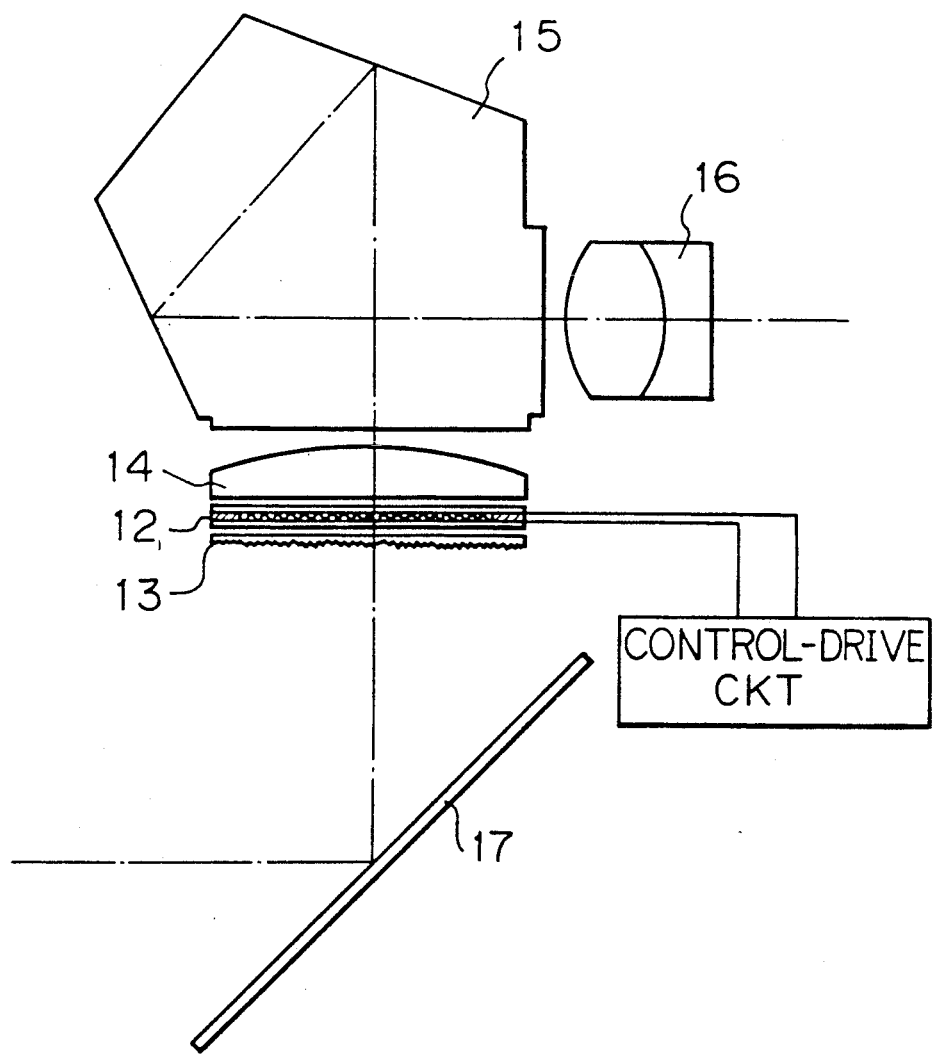
FIG. 5 is a schematic view showing a display device in a viewfinder according to the present invention.

FIG. 5 is a schematic view showing an arrangement including the display device in the viewfinder. The arrangement includes a display device 12 shown in FIG. 4D, a focusing screen 13 with a Fresnel lens, a condenser lens 14, a pentaprism 15, an eyepiece 16, and a reflecting mirror 17.

Light reflected by the object to be photographed and guided by the reflecting mirror 17 into the viewfinder is transmitted through the display device 12, the focusing screen 13 with a Fresnel lens, and the condenser lens 14 and is formed as an erect image by the pentaprism 15. The erect image is incident on the eye of the user through the eyepiece 16. If a rectangular wave AC electric field is applied across the electrodes in the display device 12, the display device 12 is kept in the light transmission state throughout the field of view within the viewfinder. The user can clearly watch the object image through the eyepiece 16. For caution display for indicating underexposure or an in-focus state, caution display patterns are deenergized in response to signals from an exposure sensor and a focusing sensor. These display patterns are held in the light-shielding state of the 0th order, thereby effecting the display.

In the display device in the viewfinder according to this embodiment, the positive dielectric nematic liquid crystal is used as the variable refractive index type material in the same manner as shown in FIGS. 4A to 4D, the nondisplay state is obtained upon application of an electric field, and the display state is obtained upon deenergization of the electric field (i.e., normally closed). However, if a negative dielectric nematic liquid crystal is used in the arrangement of FIGS. 4A to 4D, the nondisplay state can be obtained upon deenergization of the electric field, and the display state can be obtained upon energization of the electric field (i.e., normally open). If the nematic liquid crystal having a negative dielectric property is used, the liquid crystal molecules in the normal state are aligned in a direction perpendicular to the surface of the grating. When an electric field is applied in the direction perpendicular to the surface of the grating, the liquid crystal molecules are inclined in a direction perpendicular to the direction of the electric field (e.g., the direction of grooves of the grating).

It is also effective to use a variable refractive index type material having the abovementioned optical isotropy so as to obtain the normally open state. In this case, the refractive index of the transparent optical member coincides with that of the variable refractive index material in the static state where no electric field is applied to the display device.

Different display patterns will be described with reference to FIG. 6 and FIGS. 7A to 7F. A transparent optical member 18 has a half mirror inclined at an angle of 45° at the center thereof so that light through the photographing lens is partially guided to an exposure of focusing detection light-receiving element 21. The arrangement in FIG. 6 also includes an exposure or focusing detector for receiving an output from the light-receiving element 21 and analyzing an F-number and a lens drive amount. A voltage generator 23 receives a detection signal from the detector 22 and generates a predetermined voltage according to the detection signal. An output from the voltage generator 23 is applied to the display device 12.

Figure 7A:
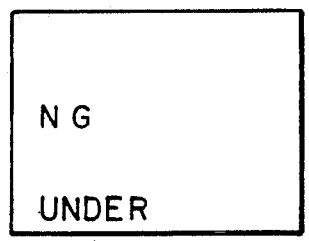
FIGS. 7A to 7F are views respectively showing different display patterns in the display device in the viewfinder.
Figure 7B:
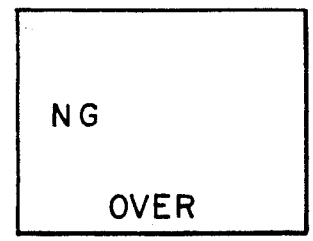
Figure 7C:
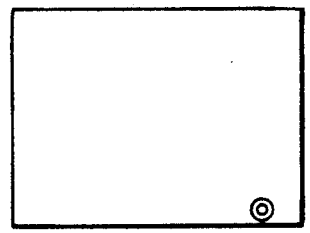
Figure 7D:
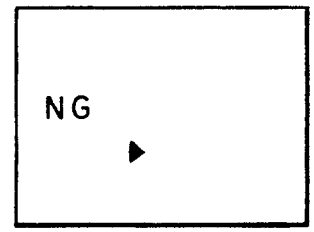
Figure 7E:
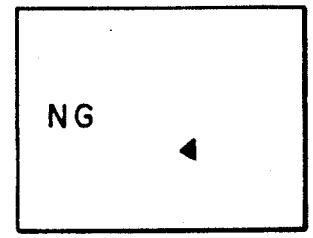
Figure 7F:
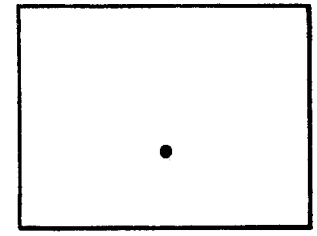

FIG. 7A shows underexposure display, FIG. 7B shows overexposure display, FIG. 7C shows optimal exposure display, FIG. 7D shows near-focus state display, FIG. 7E shows far-focus state display, and FIG. 7F shows in-focus state display. Various patterns can be displayed within the field of view with high contrast without darkening the image. If the display device is off, it does not influence the observation of the object to be photographed.

In order to perform display of the light from the object according to a predetermined pattern, as in the above embodiment, a grating may be formed in only the pattern portion, or the electrode or the like is patterned along the display pattern in the grating area. In this case, static pattern display can be selectively performed at a predetermined position within the field of view.

Furthermore, in order to perform dynamic display, i.e., matrix driving to provide the same function as the normal liquid crystal display device, a grating is formed in the entire area of the field of view, and an X-Y transparent matrix may be formed. Alternatively, the pixels are constituted by the display elements and driven by an X-Y transparent electrode matrix or a thin film transistor according to, for example, a time division scheme.

Figure 6:
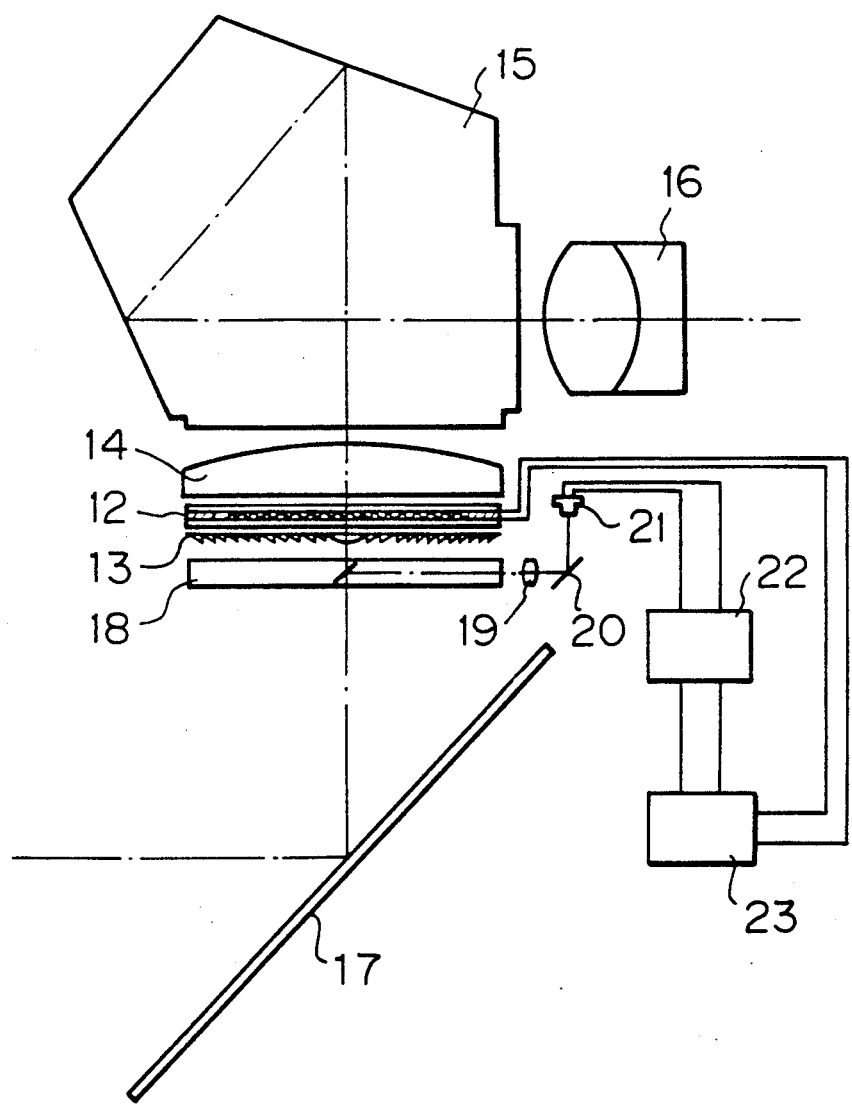
FIG. 6 is a schematic view showing a combination of an exposure or in-focus sensor and the display device in the viewfinder.

In the above embodiment, the display device 12 is arranged between the condenser lens 14 and the focusing screen 13. However, if a system is located within the viewfinder, the display device 12 may be located near the eyepiece 16. When readability of the object image and photographing information patterns, flare light (to be described later), and problems associated with the display device are taken into consideration, the position of the display device 12 is preferably near the focusing screen 13. In particular, if the display device is used in the viewfinder of a single-lens reflex camera or the like, as shown in FIGS. 5 or 6, the display device 12 must be located close to the focusing screen 13 or be located at a position conjugate with the position of the focusing screen 13 so as to observe the object image focused by the focusing screen 13 and the displayed pattern without a dioptric difference. However, if the display device 12 is used in a viewfinder of a video camera or the like, the display device can be located at a desired position by constituting the viewfinder as an afocal system. Design flexibility can be obtained in comparison with the case wherein the display device of this embodiment is used in the viewfinder of the single-lens reflex camera. It should be noted that the display device is preferably located between the focusing screen 13 and the eyepiece 16 and that a distance between the display device 12 and the focusing screen 13 is 1 mm or less. In practice, if the distance exceeds 1 mm, one of the object image and the display pattern is out of focus due to a dioptric difference.

Since the display device in the viewfinder utilizes a diffraction phenomenon of the diffraction grating, a plurality of light components of higher order generated at the time of display become flare light. The flare light consisting of the components of higher order can be eliminated when the grating pitch is reduced below a predetermined value to increase a separation angle between the components of higher and lower orders. The flare light is thus not incident on the pupil of the eyepiece 16 and is eliminated. The light components of higher order spaced apart from the pupil are normally absorbed in the inner surface of the viewfinder. However, in the viewfinder of the single-lens reflex camera in FIG. 5 or FIG. 6, a change in aperture changes the F-number, so that the angle of incidence of the object light incident on the display device 12 through the focusing screen 13 is changed. If a large F-number is selected, most of the light components from the object to be photographed can be regarded to be incident perpendicularly on the display device 12. Therefore, the influence of the light components of higher order can be reduced by defining the pitch, as described above. However, if a small F-number is selected, most of the light components from the object are regarded to be obliquely incident on the display device 12, the direction of light components of higher order from the grating of the display device 12 cannot easily be defined by only the pitch. The present inventors made extensive studies on the grating shapes so as to solve the above problem and found a desirable grating shape used in a camera viewfinder. The rectangular grating in FIG. 2A has high energy of ±1 diffracted light components. When the display device is used in the camera viewfinder, the triangular or sinusoidal grating in FIG. 1 or 2B or a trapezoidal grating is preferred. In particular, the trapezoidal grating is most preferable in association with workability and color display.

The characteristic features of the arrangement described above are applicable to a display device shown in FIGS. 10 to 12F.

Figure 10:
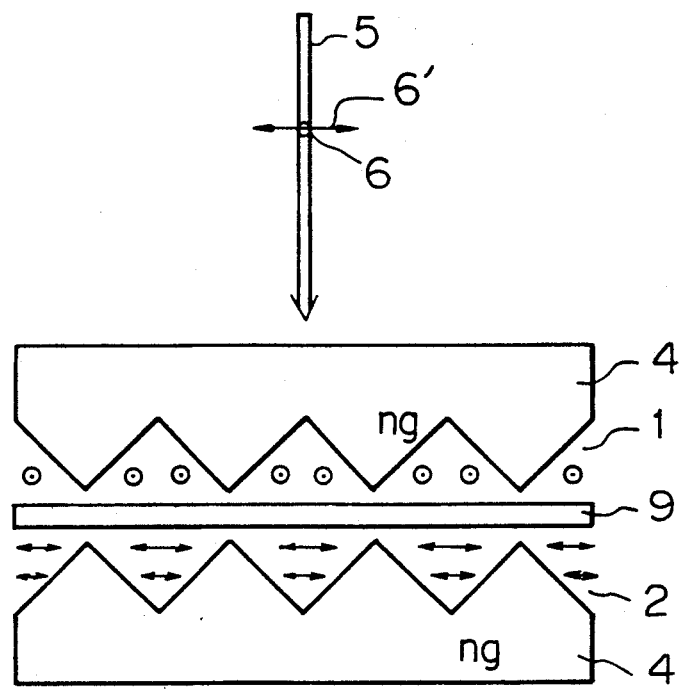
FIG. 10 is a view for explaining another basic arrangement of the display element used in the display device in the viewfinder according to the present invention.
Figure 11A:
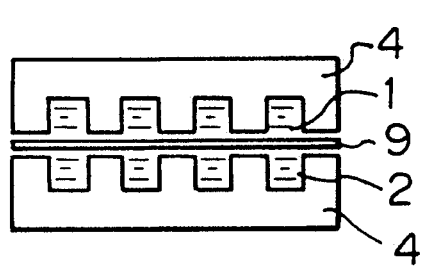
FIGS. 11A and 11B are views respectively showing other grating shapes of the display element in FIG. 10.
Figure 11B:
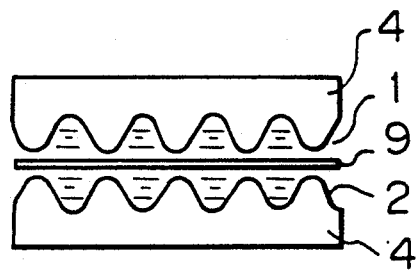

If the above display element or the display device in FIGS. 10 to 12 is incorporated in a viewfinder, the light from the object is preferably incident from the substrate side or the low refractive index member side of the display device. With this arrangement, high contrast can be always maintained. It is also preferable to arrange the three-dimensional surface of the grating formed on the members such as a plurality of substrates in one direction so as to improve the contrast. Therefore, it is preferable to cause light from the object to be incident on the flat surface side of the member having the grating, as shown in FIGS. 12B, 12E and 12F.

An embodiment using a ferroelectric liquid crystal as a variable refractive index type material (FIG. 1) will be described below.

FIGS. 8A to 8C are views for explaining the steps in manufacturing the display element using a ferrodielectric liquid crystal. The same reference numerals as in the previous embodiments denote the same parts in this embodiment. The steps in manufacturing the display element using the ferrodielectric liquid crystal will be described below.

Following the same procedures as described with reference FIG. 4, two glass substrates of Corning 7059 each having dimensions of 37 mm × 26 mm × 1 mm were prepared. As shown in FIG. 8A, a 1,000-Å thick ITO transparent electrode was formed on the entire surface of one glass substrate. 1,000-Å thick ITO transparent electrodes 25 and 25' were interdigitally formed in the pattern portion of the other glass substrate, as shown in FIG. 8B. The electrode elements of the interdigital electrodes 25 and 25' were alternately formed, as shown in FIG. 8C. PVC (polyvinylcarbazole) films were formed on the two glass substrates 4 and rubbed to align the liquid crystal molecules with the direction of the interdigital electrodes 25 and 25'. Subsequently, as shown in FIG. 8C, the two glass substrates 4 were used to sandwich a spacer therebetween and adhered thereto such that the electrode 3 opposed the electrodes 25 and 25'. A ferrodielectric liquid crystal MORA-8 was filled and sealed in spaces between the glass substrates.

The operation of the display device prepared as described above will be described with reference to FIGS. 8A to 8C and FIGS. 9A and 9B.

If the display device is not operated, a voltage is applied to neither the transparent electrode 3 nor the interdigital electrodes 25 and 25'. The optical axis of the ferroelectric liquid crystal 24 is kept unchanged, as shown in FIG. 9A. The refractive index anisotropy is uniform within a plane, thus disabling the grating. In this case, the incident light simply passes through the grating. However, in the display mode, voltages having the same absolute value but different polarities, e.g., ±5 V are applied between the transparent electrode 3 and the interdigital electrodes 25 and 25'. In this case, the optical axes of the ferroelectric liquid crystal 24 molecules located at positions corresponding to electrodes 25 and 25' are alternately inclined in opposite directions, as shown in FIG. 9B. If the relationship between the thickness T of the liquid crystal layer, the refractive index difference $\Delta n'$, and the incident light wavelength $\lambda$ is controlled to satisfy equation (2), light from the object is partially shielded by the display pattern region. Therefore, high-contrast display can be performed within the field of view while the entire image is kept bright.

If the liquid crystal has a capability of memory, as in the ferroelectric liquid crystal, the initial orientation is set uniform, and then the polarity of the electric field applied to one of the interdigital electrodes 25 or 25' is changed to restore the initial state.

The display devices in the above two embodiments have patterns to be displayed. However, the display device in the viewfinder can be driven in a matrix form. If matrix driving is performed by a combination of the display device and various camera sensor, in-focus display, optimal exposure display, and the like can be performed, thus providing various forms of display.

As described above, the display device in the viewfinder applies external energy such as an electric field to the variable refractive index type material through the control means to cause the diffraction grating to appear in or disappear from the viewfinder. When the diffraction grating disappears from the viewfinder, the light from the object simply passes through the viewfinder and thus the viewfinder is kept bright. When the diffraction grating appears according to a predetermined pattern, light transmitted through the pattern portion is diffracted and partially converted to diffracted light components of higher order so that the pattern is displayed with the light of the 0th order. If display is performed by driving of a matrix consisting of a plurality of pixels, the diffraction grating appears at a desired position within the field of view in response to a control signal.

Another arrangement of the display element used in the display device in the viewfinder according to the present invention will be described hereinafter.

FIG. 10 shows the basic arrangement of the display element used in the display device in the viewfinder so as to explain the principle of display in the same manner as in FIG. 1. This arrangement includes a transparent spacer 9. The same reference numerals as in FIG. 1 denote the same parts in FIG. 9. The characteristic feature of the display element of this embodiment lies in the fact that incident light 5 passes through a two-layered grating. The first layer (viewed from the incident side of light 5) comprises a first grating consisting of a transparent optical member 4 having a refractive index $n_g$ and an anisotropic material 1. The second layer comprises a second grating consisting of a transparent optical member 4 having a refractive index $n_g$ and an anisotropic material 2.

Referring to FIG. 10, the optical axis of the anisotropic material 1 of the first layer is aligned with a direction of the grooves of the grating (i.e., a direction perpendicular to the surface of FIG. 10). The optical axis of the anisotropic material 2 of the second layer is aligned with a direction of alignment of the grating (i.e., a right-and-left direction of FIG. 10). The optical axes of the anisotropic materials 1 and 2 are changed by external energy such as an electric field. The incident light 5 is diffracted at the diffractive indexes of the anisotropic materials 1 and 2. In the static state where no electric field is applied to the display element, a polarization component 6 of the light 5 incident on the first layer is diffracted at an extraordinary index $n_e$ of the anisotropic material 1. A polarizing component 6' is diffracted at an ordinary index $n_o$ of the anisotropic material 1. In the second layer, the polarization component 6 of the incident light 5 is diffracted at an ordinary index $n_o'$ of the anisotropic material 2, and an polarization component 6' is diffracted at an extraordinary index $n_e'$ of the anisotropic material 2. Diffraction efficiency $\eta 01$ of the diffracted light of the 0th order in the first layer and diffraction efficiency $\eta 02$ thereof in the second layer are given as equations (1)' and (1)'' below:

$$\eta 01 = \text{sinc}^2(\pi \Delta n T / \lambda) \quad (1)'$$

$$\eta 02 = \text{sinc}^2(\pi \Delta n' T' / \lambda) \quad (1)''$$

where
$n_g$: the refractive index of the transparent optical member 2 constituting the grating of the first layer
T: the height of the grating of the first layer
$n_g'$: the refractive index of the transparent optical member 2 constituting the second layer of the grating
T': the height of the grating of the second layer
$\lambda$: the wavelength fo the incident light If $\Delta n = 0$, then $\eta 01 = 1$. However, if $\Delta n' = 0$, then $\eta 02' = 1$. If $\Delta n T = m\lambda$ (where m = 1, 2, 3, . . . ), then $\eta 01 = 0$. If $\Delta n' T' = m\lambda$ (where m = 1, 2, 3, . . . ), then $\eta 02' = 0$. In other words, if the first layer satisfies $n_o = n_g$ or $n_e = n_g$, one of the polarization components 6 and 6' passes through the first layer. The other one is modulated according to equation (1)'. If the second layer satisfies $n_o' = n_g'$ or $n_e' = n_g'$, one of the polarization components 6 and 6' passes through the second layer. The other one is modulated according to equation (1)''.

If an electric field is applied to the anisotropic materials 1 and 2, the optical axes thereof are changed, and the refractive indexes associated with the polarization components 6 and 6' of the incident light 5 are changed accordingly. In other words, the incident light 5 is modulated by the first and second layers according to equations (1)' and (1)'' upon changes in $\Delta n$.

For example, if the anisotropic materials 1 and 2 are made of the same material, $n_e = n_e'$ and $n_o = n_o'$ are given. If the initial conditions are given as $n_g = n_g' = n_o$, $T = T'$, and $|n_e - n_g| \cdot T = m\lambda$, the diffraction efficiency of the first and second layers for the diffracted light of the 0th order can be expressed by equation (1). In this embodiment, it is assumed that the refractive index of the spacer 4 is substantially the same as $n_g$. In the static state, the polarization component 6' of the incident light 5 passes through the first layer, but the polarization component 6 is diffracted by equation (1) such that $\eta 0 = 0$. The light of the 0th order is not output from the first layer and becomes the light components of the higher order. These components are output as the diffracted component from the first layer. In the second layer, the polarization component 6' is subjected to $\eta 0 = 0$ according to equation (1). Light of the 0th order is diffracted, and the diffracted components of the higher order are output from the second layer. The polarization component 6 passes through the second layer. Therefore, no light components of the 0th order are output from the display element of this embodiment.

If a predetermined electric field is applied to orient the optical axes (alignment direction) of the liquid crystals 1 and 2 in a direction perpendicular to the grating surface, i.e., in a propagation direction of the incident light 5, the polarization components 6 and 6' of the incident light 5 are diffracted at the ordinary indexes $n_o$ of the liquid crystals 1 and 2 in the first and second layers. The incident light 5 passes through the display element and is output as the light of the 0th order.

Modulation of the object light can be performed by the application/removal of the electric field without using polarizing plates or the like.

In the display element shown in FIG. 10, the alignment direction is the same in the gratings of the respective layers. However, the alignment directions of the gratings of the respective layers are not limited to one direction. Each grating has a triangular shape. However, as shown in FIG. 11, the grating shape may be a rectangular or sinusoidal one. The desired function can be obtained irrespective of the grating shapes. If the triangular grating shape is replaced with the rectangular grating shape, the diffraction efficiency given by equation (1) is replaced with equation (2).

In addition, the respective gratings may have different shapes. The grating shape is determined in favor of easy workability, technical specifications, and the like.

FIGS. 12A to 12F show basic patterns of the display element in FIG. 10. The display elements in FIGS. 12D and 12E have transparent heaters 90. The reference numerals as in FIGS. 10 and 11 denote the same part in FIGS. 12A to 12F.

Figure 12A:
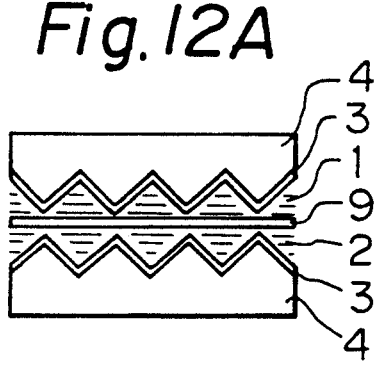
FIGS. 12A to 12F are views respectively showing different arrangements of the display element in FIG. 10.
Figure 12B:
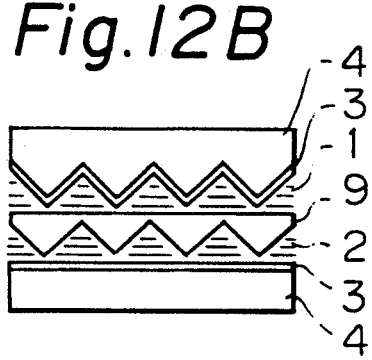
Figure 12C:
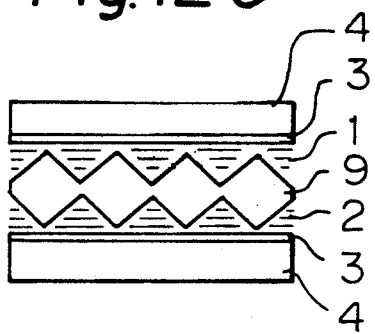

FIGS. 12A to 12C show the basic arrangements of electric field controlled display elements. Two superposed gratings are formed in each element. In the display element in FIG. 12A, transparent optical members 4 have triangular gratings, respectively. The transparent optical members 4 are slightly spaced apart from each other through a flat transparent spacer 9. Anisotropic materials 1 and 2 are filled in the spaces between the transparent optical members 4. Transparent electrodes 3 for controlling the characteristics of the anisotropic materials 1 and 2 are formed along the gratings of the transparent optical members 4. In the display element in FIG. 12B, a grating is formed on the inner surface of one of transparent optical members 4, and a grating formed on a transparent spacer 9 faces the other transparent optical member 4 without a grating. The anisotropic materials 1 and 2 filled between the transparent optical members 4 and divided into upper and lower layers. Transparent electrodes 3 are formed on the inner surfaces of the transparent optical members 4, respectively. In the display element in FIG. 12C, a pair of transparent optical members 4 having flat transparent electrodes 3 on their inner surfaces are spaced apart from each other through a transparent spacer 9 having gratings on both major surfaces thereof. Anisotropic materials 1 and 2 are filled between transparent optical members 4 having a transparent spacer 9 interposed therebetween.

Figure 12D:
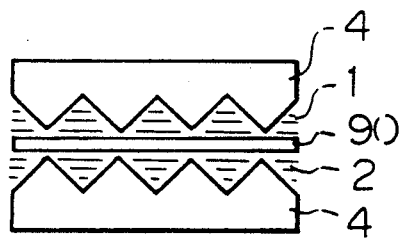
Figure 12E:
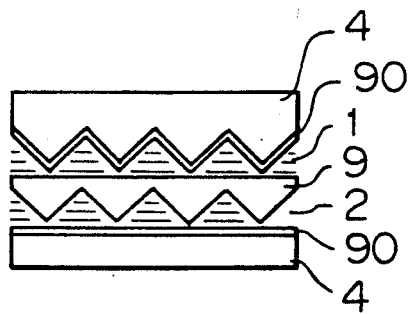

FIGS. 12D and 12E have substantially the same basic arrangements as those in FIGS. 10 and 11. In the display element of FIG. 12D, a transparent heater 90 is used in place of the spacer 9 to separate the anisotropic materials 1 and 2 into upper and lower layers. In the display element of FIG. 12E, a transparent heater 90 is used in place of the transparent electrodes 3 in FIG. 12B.

Figure 12F:
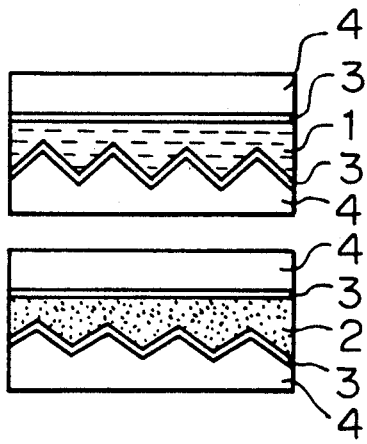

The arrangement in FIG. 12F consists of upper and lower display elements each of which has one grating. Anisotropic materials 1 and 2 respectively filled in the upper and lower display elements have different optical axes. The gratings are respectively formed on the inner surfaces of transparent optical members 4 of the dispaly elements. An electric field is applied across transparent electrodes 3 formed on the members 4, thereby controlling the optical axes of the anisotropic materials 1 and 2.

The principle of operation of the above display elements and a method of fabricating the dispaly element in FIG. 12A will be described hereinafter.

FIG. 13 shows steps in manufacturing the display element in FIG. 12A. Liquid crystals 10 and 10' having different alignment directions are shown in FIGS. 13A to 13D. The same reference numerals as in FIG. 1 denote the same parts in FIGS. 13A to 13D. Both major surfaces of a transparent PBMA resin substrate 4 ($37 \times 26 \times 1$ mm$^3$ and $n_g = 1.56$) were finished as transparent surfaces. A triangular grating was entirely embossed on one of the major surfaces of the substrate 4 at a pitch of 3 $\mu$m and a depth of 2.4 mm, as shown in FIG. 13A. Subsequently, a 1,000-Å thick ITO film 3 was formed on the entire surface of the grating substrate 4.

Figure 13A:
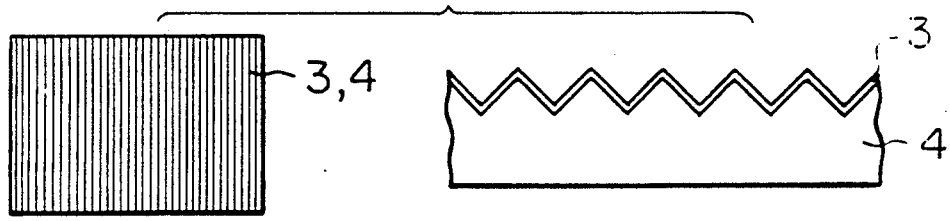
FIGS. 13A to 13D are views respectively for explaining the steps in manufacturing a display device using the display element in FIG. 10.
Figure 13B:
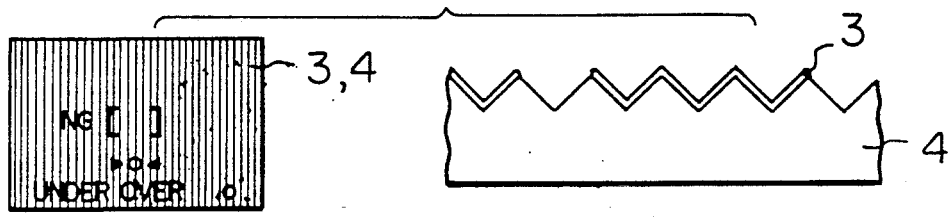
Figure 13C:
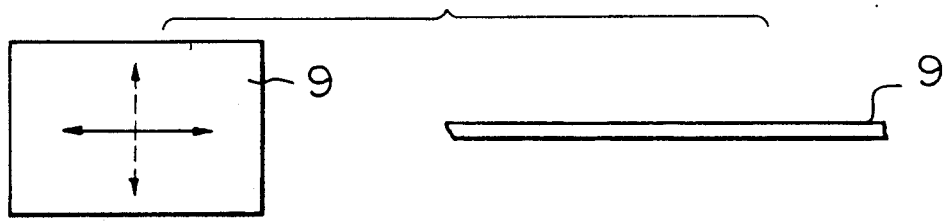
Figure 13D:
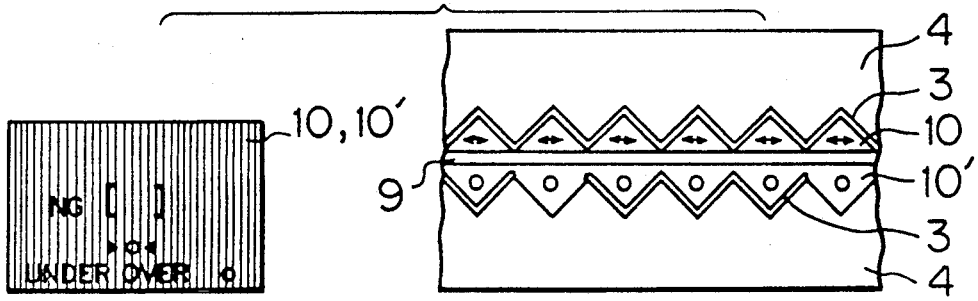

Following the same procedures as in FIG. 13A, another transparent PBMA substrate 4 having the display pattern as shown in FIG. 13B was prepared. A 5-$\mu$m thick Teflon spacer 9 having upper and lower surfaces rubbed in the directions (FIG. 13C) opposite to each other was sandwiched between the two transparent PBMA substrates 4. Positive dielectric liquid crystal materials MBBA ($n_o = 1.56$ and $n_e = 1.786$) 10 and 10' were respectively filled in the spaces defined between the surface of the upper electrode 3 and the upper surface of the spacer 9 and between the surface of the lower electrode 3 and the lower surface of the spacer 9, thereby preparing the display element in FIG. 13D.

Figure 14:
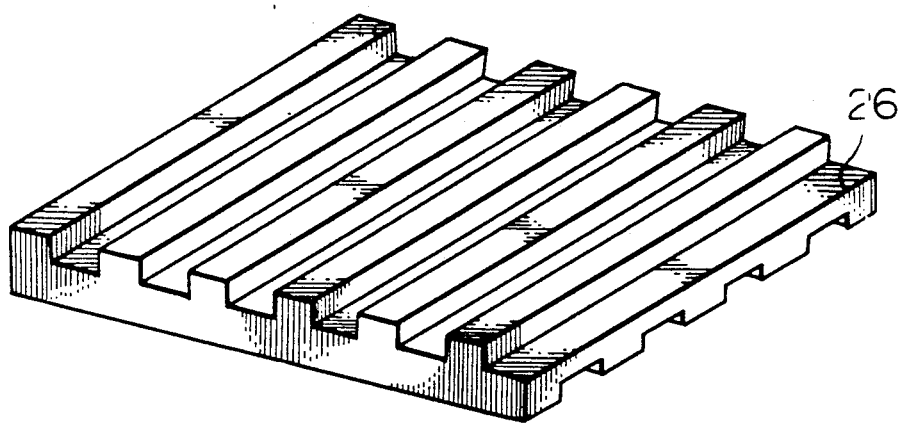
FIG. 14 is a perspective view showing a spacer used in the display element in FIG. 10.

A method of manufacturing the display element in FIG. 12C will be described below. Rectangular gratings (FIG. 14) having a pitch of 3 $\mu$m and a depth of 1.8 $\mu$m were formed in both surfaces of a transparent PMMMA resin film 26 (to be served as a spacer) by using a rectangular wave hot-rolling roller. The gratings on the upper and lower surfaces of the film 26 were perpendicular to each other.

Both surfaces of two BK 7 substrate ($37 \times 26 \times 1$ mm$^3$ and $n_g = 1.49$) were polished to be transparent flat surfaces. 1,000-Å thick ITO films were respectively formed on the entire surface of one substrate and on the surface of the other substrate in the form of a pattern shown in FIG. 13B. Subsequently, the two BK 7 substrate were spaced apart from each other such that ITO films opposed each other. Thereafter, a film 26 having grating was sandwiched between the BK 7 substrates. A positive dielectric liquid crystal ZLI-2141-000 (available from Merck & Co., Inc.) having $n_o$ of 1.49 and $n_e$ of 1.64 was filled between the upper BK 7 substrate and the grating of the film 26 and between the lower BK 7 substrate and the grating, and the liquid crystal was forcibly oriented along the grooves of the gratings. The axis of the upper liquid crystal layer was perpendicular to the axis of the lower liquid crystal layer.

The display elements in FIGS. 10 to 14 are suitable for the display devices in the viewfinders in FIGS. 5 and 6 to effectively modulate the object light and perform monochromatic and color display with high contrast.

In the display elements described in FIGS. 1 to 9 as well as the ones in FIGS. 10 to 14, the liquid crystal is preferably a variable refractive index type material in consideration of the difference between the extraordinary and ordinary indexes $n_e$ and $n_o$, and the drive energy level.

In the display elements shown in FIGS. 10 to 14, the anisotropic materials need not be alternately arranged. For example, the liquid crystals or the like need not be alternately filled using a thin spacer. These display elements can be simply formed as compared with the elements represented by the one shown in FIG. 1. In the display elements in FIG. 10 to 14, since display is performed using the superposed diffraction gratings, the patterns of the upper and lower diffraction gratings must be precisely aligned. Otherwise, pattern errors occur. In particular, a plurality of display elements are used, as shown in FIG. 12F, the superposed diffraction gratings must come close to each other in favor of consumption of drive energy such as an electric field. Even in the single display elements each having a plurality of diffraction gratings shown in FIGS. 12A to 12E, a distance between the diffraction gratings and thicknesses of the spacer and the substrate must be minimized.

In the display elements in the above embodiments, when the liquid crystal is used as a variable refractive index type material, the orientation of the liquid crystal molecules is of a great importance. It is known that a liquid crystal (especially a nematic liquid crystal) can be orientated by a micropattern such as a grating of the present invention. In order to satisfy various specifications such as drive energy (e.g., an electric field), and a response time of the element, the grating pitch or the first and second materials constituting the grating is changed, a different grating fabrication method is employed, and/or a molecular treatment such as rubbing or oblique deposition is performed, thereby obtaining an optimal orientation state.

Taking the orientation function of the grating into account, if the orientation directions of the upper and lower liquid crystal layers are perpendicular to each other, the grooves of the grating are preferably perpendicular to each other.

According to the display elements in viewfinders according to the present invention, since they do not have the polarization properties, the polarizing plates can be omitted. In the non-display state, the object light can be transmitted through each display element at a high transmittance. However, if photographing information is displayed, its pattern can be displayed with the viewfinder with high contrast. The caution patterns and photographing information can be displayed inside and outside the frame of the viewfinder any time at any location while the size and brightness of the field of view are maintained.

By using the wavelength selectivity of the grating, i.e., the diffraction grating, color display can be performed within the viewfinder without using a color filter or the like.

Various display schemes may be employed. Examples are a scheme for displaying a predetermined display pattern by static driving, a scheme for displaying a desired pattern at any location by matrix driving, such as displaying of numerals with 7-segment display elements, or the like.

I claim:

1. A viewfinder comprising:
a display device having a first material and a second material separated from each other by an interface, at least one of these materials being a material with a refractive index variable by a control means in such a way that in a first state the light from an object simply passes through said display device and that in a second state part of the light from the object is diffracted to display a pattern, and said first and second materials form a diffraction grating in said second state wherein said interface between said first and said second materials determines the shape of said diffraction grating, wherein all diffraction lines are formed in a same direction so that a diffracted light beam expands two-dimensionally when the diffraction grating is created, and a portion of the diffracted light generated by said diffraction grating is incident upon an eyepiece of the viewfinder.

2. A camera comprising:
a photographing lens system having an aperture, which is variable; and
a viewfinder comprising:
a display device having a first material and a second material separated from each other by an interface, at least one of these materials being a material with a refractive index variable by a control means in such a way that in a first state the light from an object simply passes through said display device and that in a second state part of the light from the object is diffracted to display a pattern, and said first and said second materials form a diffraction grating in said second state wherein said interface between said first and said second materials determines the shape of said diffraction grating, wherein all diffraction lines are formed in a same direction so that a diffracted light beam expands two-dimensionally when the diffraction grating is created, and a portion of the diffracted light generated by said diffraction grating is incident upon an eyepiece of the viewfinder.

3. A viewfinder system in which an object image and a display pattern are capable of being superimposed for observation, said viewfinder system comprising:
display means for selectively creating and dissipating a diffraction grating in response to an input signal to said display means, said display means being disposed in a light path of a light from an object, the display pattern being formed by said diffraction grating and the light from the object being diffracted in accordance with said display pattern, said display means including a light modulation device, said light modulation device comprising:
a first substrate;
a second substrate having a surface parallel with a surface of said first substrate, said surface being opposite to the surface of said first substrate;
a grating formed between said first and second substrates, said grating being alternately formed between a first optical member and second optical member, said second optical member comprising a pneumatic liquid crystal having negative dielectric anisotropy, said liquid crystal being oriented in a direction substantially perpendicular to be surface of said substrate in an initial state, thereby matching refractive index of said liquid crystal to refractive index of said first optical member;
means for applying an electric field to said grating in said perpendicular direction, said electric field application being performed so as to orient said liquid crystal in a direction substantially parallel with said surface, wherein the refractive indices of said first optical member and said liquid crystal are different from each other so that said grating acts as a diffraction grating for diffracting an incident light thereon, wherein all diffraction lines are formed in a same direction so that a diffracted light beam expands two-dimensionally when the diffraction grating is created; and
an optical system comprising an eyepiece for observing the object image and the display pattern, said optical system and said display device being disposed in such a manner that a portion of a diffracted light generated by said diffraction grating is incident upon said eyepiece and the remainder of the diffracted light generated by said diffraction grating is incident outside of said eyepiece.

4. A viewfinder system in which an object image and a display pattern are capable of being superimposed for observation, said viewfinder system comprising:
a display device for selectively creating and dissipating a diffraction grating in response to an input signal to said display device, said display device being disposed in an optical path of a light from an object, the display pattern being formed by said diffraction grating and the light from the object being diffracted in accordance with said display pattern, said display device including:
a transparent substrate;
first and second members alternatively formed on said substrate, said first and second members respectively having optical anisotropy; and
means for varying the direction of an optic axis of at least one of said first and second members, wherein said varying means acts on said at least one of said first and second members in accordance with said input signal so as to selectively create a first condition in which the refractive indices of said first and second members are equal to each other, resulting from the coincidence of the directions of the optical axes of said first and second members, and a second condition in which the refractive indices of said first and second members are different from each other, resulting from the directions of the optical axes of said first and second members being substantially perpendicular to each other in a plane parallel with the surface of said substrate, to reveal the diffraction grating for diffracting both polarization components of the light from said object, said components being perpendicular to each other, wherein all diffraction lines are formed in a same direction so that a diffracted light beam expands two-dimensionally when the diffraction grating is created; and an optical system comprising an eyepiece for observing the object image and the display pattern, said optical system and said display device being disposed in such a manner that a portion of a diffracted light generated by said diffraction grating is incident upon said eyepiece and the remainder of the diffracted light generated by said diffraction grating is incident outside of said eyepiece.

5. A viewfinder system according to claim 4, wherein said first and second members are respectively made of liquid crystals, and the directions of the optical axes thereof coincide with the orientations of said liquid crystals.

6. A viewfinder system in which an object image and a display pattern are capable of being superimposed for observation, said viewfinder system comprising:

display means disposed in an optical path of a light from an object, said display means including:

(i) first transparent substrates, a first transparent member and a first liquid crystal layer alternately formed between said first substrates, and first means for varying the orientation of liquid crystal molecules of said liquid crystal layer in accordance with an input signal to said varying means, said varying means acting on said liquid crystal layer so as to selectively create a first condition in which the refractive indices of said transparent member and said liquid crystal layer are equal to each other and a second condition in which the refractive indices of said transparent member and said liquid crystal layer are different from each other by orienting liquid crystal molecules of said liquid crystal layer along a first direction substantially parallel with the surface of said first substrate to reveal a first diffraction grating for forming a first display pattern by which one of the polarization components being perpendicular to the other, of the light from the object is diffracted, (ii) second transparent substrates, said substrates being provided to be parallel with said first transparent substrates and provided adjacent to said first substrates along an optical path of the system;

a second transparent member and a second liquid crystal layer alternately formed between said second substrates; and second means for varying the orientation of liquid crystal molecules of said second liquid crystal layer, said second varying means acting on said second liquid crystal layer so as to selectively create a first condition in which the refractive indices of said second transparent member and said second liquid crystal layer are equal to each other and a second condition in which the refractive indices of said second transparent member and said liquid crystal layer are different from each other by orienting liquid crystal molecules of said second liquid crystal layer along a second direction perpendicular to said first direction and being substantially parallel with the surface of said second substrate to reveal a second diffraction grating for forming the second display pattern similar to said first display pattern by which the other of polarization components being perpendicular to each other, of the light from the object is diffracted, and the second display pattern of the second diffraction grating and the first display pattern of the first diffraction grating are superimposed with each other, wherein all diffraction lines are formed in a same direction so that a diffracted light beam expands two-dimensionally when the diffraction grating is created; and an optical system comprising an eyepiece for observing the object image and the display pattern, said optical system and said display device being disposed in such a manner that a portion of a diffracted light generated by said diffraction grating is incident upon said eyepiece and the remainder of the diffracted light generated by said diffraction grating is incident outside of said eyepiece.

7. A viewfinder system according to claim 6, further comprising a focusing plate on which the object image is formed and which is disposed near said display means.

8. A viewfinder system in which an object and a display pattern are capable of being superimposed for observation, comprising:

a display device disposed in an optical path of a light beam from the object, said device being formed by alternately arranging a liquid crystal and an optical member between a pair of substrates so as to form a grating, with the height of said liquid crystal and said optical member being substantially equal to the distance between said pair of substrates;

means for changing a refractive index of said liquid crystal, thereby creating a first condition under which the refractive indices of said liquid crystal and said optical member are substantially equal to each other and a second condition under which the refractive indices of said liquid crystal and said optical member are different from each other, with said grating acting as a diffraction grating to generate said display pattern by diffracting said light beam, wherein all diffraction lines are formed in a same direction so that a diffracted light beam expands two-dimensionally when the diffraction grating is created; and an optical system comprising an eyepiece for observing the object image and the display pattern, said optical system and said display being disposed in such a manner that a portion of a diffracted light generated by said diffraction grating is incident upon said eyepiece and the remainder of the diffracted light generated by said diffraction grating is incident outside of said eyepiece.

9. A viewfinder system according to claim 8, further comprising a focusing screen where an image of the object is formed, said focusing screen being disposed in said optical path, and said display device being provided adjacent to said focusing screen.

10. A viewfinder system according to claim 9, wherein said optical system further includes a pentaprism, wherein said pentaprism is provided between said display device and said eyepiece.

11. A viewfinder system according to claim 8, wherein said liquid crystal comprises a nematic liquid crystal having a positive dielectric anisotropy.

12. A viewfinder system according to claim 11, wherein said display device is constructed so that molecules of said liquid crystal are oriented substantially perpendicular to the surfaces of said pair of substrates in said first condition.

13. A viewfinder system according to claim 11, wherein said refractive index changing means has electrode films provided on the surfaces of said pair of substrates, which are opposite to each other, and means for applying a voltage between said electrode films, the refractive index of said liquid crystal being changed by changing the orientation directions of molecules of said liquid crystal by using an electric field generated by the application of said voltage.

14. A viewfinder system, in which an object and a display pattern are capable of being superimposed for observation, comprising:
- a display device disposed in an optical path of a light beam from the object, said device being formed by adjacently arranging a first display part and a second display part along the optical path of said light beam, said display parts being respectively formed by alternately arranging a liquid crystal and an optical member so as to form a grating, said gratings of said respective display parts being provided respectively along planes parallel with each other, said liquid crystals of said first and second display parts being separated from each other whereby the device is formed such that substantially no liquid crystals are present between said first and second display parts;
- means for changing a refractive index of said liquid crystal of each of said display parts, thereby creating a first condition in which the refractive indices of said liquid crystal and said optical member are substantially equal to each other in each of said display parts and a second condition in which liquid crystals of the gratings of respective display parts are oriented respectively along directions perpendicular to each other, the refractive indices of said liquid crystal and said optical member are different from each other in accordance with said respective display parts so that said grating acts as a diffraction grating to generate said display pattern by diffracting both polarization components of said light beam through cooperation of said diffraction gratings of said display parts, said polarization components being perpendicular to each other, wherein all diffraction lines are formed in a same direction so that a diffracted light beam expands two-dimensionally when the diffraction grating is created; and
- an optical system comprising an eyepiece for observing the object and said display device being disposed in such a manner that a portion of a diffracted light generated by said diffraction grating is incident upon said eyepiece and the remainder of the diffracted light generated by said diffraction grating is incident outside of said eyepiece.

15. A viewfinder system according to claim 14, further comprising a focusing screen where an image of the object is formed, said focusing screen being disposed in said optical path, and said display device being provided adjacent to said focusing screen.

16. A viewfinder system according to claim 15, wherein said optical system further includes a pentaprism, wherein said pentaprism is provided between said display device and said eyepiece.

17. A viewfinder system according to claim 14, wherein said liquid crystals of said display parts comprise a nematic liquid crystal having a positive dielectric anisotropy.

18. A viewfinder system according to claim 17, wherein said display parts are respectively constructed so that molecules of said liquid crystal are oriented substantially along the optical axis of said viewfinder system in said first condition.

19. A viewfinder system according to claim 17, wherein said refractive index changing means has means for changing the orientation directions of said liquid crystals of said respective display parts by applying an electric field to said liquid crystals of said respective display parts.

20. A viewfinder system, in which an object and a display pattern are capable of being superimposed for observation, comprising:
- a display device disposed in an optical path of a light beam from the object, said display device being formed by alternately arranging a first liquid crystal and a second liquid crystal between a pair of substrates so as to form a grating;
- means for changing a refractive index of at least one of said first and second liquid crystals, thereby creating a first condition in which the refractive indices of said first and second liquid crystals are substantially equal to each other and a second condition in which the refractive indices of said first and second liquid crystal are different from each other, wherein the oriented directions of said first and second liquid crystals in said second condition are substantially perpendicular to each other in a plane parallel with the surface of said substrates so that said grating acts as a diffraction grating to generate said display pattern by diffracting both polarization components of the light beam from the object, said polarization components being perpendicular to each other, wherein all diffraction lines are formed in a same direction so that a diffracted light beam expands two-dimensionally when the diffraction grating is created; and
- an optical system comprising an eyepiece for observing the object image and the display pattern, said optical system and said display device being disposed in such a manner that a portion of a diffracted light generated by said diffraction grating is incident upon said eyepiece and the remainder of the diffracted light generated by said diffraction grating is incident outside of said eyepiece.

21. A viewfinder system according to claim 20, further comprising a focusing screen where an image of the object is formed, said focusing screen being disposed in said optical path, and said display device being provided adjacent to said focusing screen.

22. A viewfinder system according to claim 21, wherein said optical system further includes a pentaprism, wherein said pentaprism is provided between said display device and said eyepiece.

23. A viewfinder system according to claim 20, wherein said first and second liquid crystal respectively comprise a ferroelectric liquid crystal.

24. A viewfinder system according to claim 23, wherein said display device is constructed so that molecules of each of said first and second liquid crystals are oriented to be substantially parallel to the surfaces of said pair of substrates, with said surfaces being opposite to each other.

* * * * *

UNITED STATES PATENT AND TRADEMARK OFFICE
CERTIFICATE OF CORRECTION

PATENT NO. : 5,299,037
DATED : March 29, 1994
INVENTOR(S) : HAJIME SAKATA

It is certified that error appears in the above-indentified patent and that said Letters Patent is hereby corrected as shown below:

ON THE COVER PAGE
    At item [56], FOREIGN PATENT DOCUMENTS
       "3605516  9/1986  Japan" should read
       --3605516  9/1986  Germany--.

At item [56], OTHER PUBLICATIONS
       "S.Lo" should read --S. Lu, et al.--.

COLUMN 3
    Line 20, "comprises" should read --comprise--.

COLUMN 4
    Line 37, "is" should read --are--.

COLUMN 6
    Line 31, "electrodes 3" should read --electrode 3--.

COLUMN 10
    Line 36, "the" should read --a--; and "a" should read --the--.

COLUMN 11
    Line 34, "an" should read --a--; and
    Line 52, "fo" should read --of--.

UNITED STATES PATENT AND TRADEMARK OFFICE
CERTIFICATE OF CORRECTION

PATENT NO. : 5,299,037
DATED : March 29, 1994
INVENTOR(S) : HAJIME SAKATA

It is certified that error appears in the above-indentified patent and that said Letters Patent is hereby corrected as shown below:

<u>COLUMN 13</u>
    Line 4, "filled" should read --are filled--;
    Line 28, "dispaly" should read --display--; and
    Line 33, "dispaly" should read --display--.

<u>COLUMN 14</u>
    Line 1, "substrate" should read --substrates--; and
    Line 7, "strate" should read --strates--.

Signed and Sealed this

Twenty-second Day of November, 1994

Attest:

BRUCE LEHMAN

*Attesting Officer*      *Commissioner of Patents and Trademarks*